(12) United States Patent  
Kim

(10) Patent No.: US 12,536,071 B2  
(45) Date of Patent: Jan. 27, 2026

(54) MEMORY CONTROLLERS AND STORAGE DEVICES INCLUDING THE SAME

(71) Applicant: Samsung Electronics Co., Ltd., Suwon-si (KR)

(72) Inventor: Hyun Sub Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/804,211

(22) Filed: Aug. 14, 2024

(65) Prior Publication Data

US 2025/0252016 A1 Aug. 7, 2025

(51) Int. Cl.
G06F 11/00 (2006.01)
G06F 11/10 (2006.01)
G06F 11/14 (2006.01)
G06F 13/16 (2006.01)

(52) U.S. Cl.
CPC ...... G06F 11/1068 (2013.01); G06F 11/1435 (2013.01); G06F 13/1673 (2013.01)

(58) Field of Classification Search
CPC .............. G06F 11/1048; G06F 11/1068; G06F 13/1673; G06F 11/1016; G06F 11/1435
See application file for complete search history.

(56) References Cited

U.S. PATENT DOCUMENTS

| | | | |
|---|---|---|---|
| 7,581,153 B2* | 8/2009 | Micheloni | G06F 11/1048 714/763 |
| 8,806,112 B2* | 8/2014 | Somanache | G06F 12/0246 711/103 |
| 9,264,070 B2* | 2/2016 | Suzumura | G06F 11/1048 |
| 9,405,620 B2* | 8/2016 | Chou | H03M 13/3707 |
| 9,859,022 B2* | 1/2018 | Kim | G11C 29/52 |
| 10,700,703 B2 | 6/2020 | Khan et al. | |
| 11,269,704 B2* | 3/2022 | Masakawa | G06F 11/1048 |
| 11,269,723 B2* | 3/2022 | Cha | G06F 11/0772 |
| 11,379,153 B2* | 7/2022 | Porzio | G06F 3/0673 |
| 11,474,721 B2* | 10/2022 | Kim | G11C 16/0483 |
| 2011/0161774 A1 | 6/2011 | Shin et al. | |
| 2022/0188188 A1 | 6/2022 | Twitto | |
| 2023/0140746 A1 | 5/2023 | Jung | |

FOREIGN PATENT DOCUMENTS

KR 20110073932 A 6/2011
KR 20230064279 A 5/2023

* cited by examiner

*Primary Examiner* — Esaw T Abraham

(74) *Attorney, Agent, or Firm* — Wolf, Greenfield & Sacks, P.C.

(57) ABSTRACT

A memory controller configured to write, read, and erase data for a nonvolatile memory device storing first meta data and first journal data indicating first changes of the first meta data, the memory controller comprising: a buffer memory circuit including a buffer memory and a buffer controller, wherein the buffer memory stores second meta data and second journal data indicating second changes of the second meta data, and wherein the buffer controller controls the buffer memory; and an accelerator managing the first meta data, the second meta data, the first journal data, and the second journal data, wherein the buffer controller includes: a first error correction code (a first ECC) engine configured to correct a first error of first data that includes the second meta data; and a second error correction code (a second ECC) engine configured to correct a second error of second data including the second journal data.

20 Claims, 14 Drawing Sheets

MEMORY CONTROLLERS AND STORAGE DEVICES INCLUDING THE SAME

CROSS-REFERENCE TO RELATED APPLICATIONS

This application claims priority from Korean Patent Application No. 10-2024-0017247 filed on Feb. 5, 2024, in the Korean Intellectual Property Office and all the benefits accruing therefrom under 35 U.S.C. 119, the contents of which in its entirety are herein incorporated by reference.

BACKGROUND OF THE INVENTION

Technical Field

The present inventive concepts relate to (semiconductor) integrated circuits. More particularly, the present inventive concepts relate to memory controllers and storage devices including the same.

Description of the Related Art

Semiconductor memories are classified into volatile memory devices, such as a static random-access memory (SRAM) and dynamic random-access memory (DRAM), in which stored data are lost when power supply is cut off, and nonvolatile memory devices, such as a flash memory device, phase-change random-access memory (PRAM), magnetoresistive random-access memory (MRAM), resistive random-access memory (RRAM), and ferroelectric random-access memory (FRAM), in which stored data are maintained even when power supply is cut off. The flash memory device is widely used as a mass storage device. A memory controller (or storage controller) that controls the flash memory device may use meta data and journal data including change details (indicating changes) of the meta data to control the flash memory device. The meta data may include data such as a mapping table, and, for fast use, may be transferred to a high-speed memory (e.g., DRAM or SRAM) inside the memory controller. When the meta data is damaged, the reliability of storage device (e.g., flash memory device of the storage device) cannot be guaranteed, so data errors (e.g., damaged data) can be corrected through an error correction code (ECC) engine when the meta data and the journal data are input/output.

SUMMARY OF THE INVENTION

An object of the present inventive concepts is to provide a memory controller in which reliability is improved.

Another object of the present inventive concepts is to provide a storage device in which reliability is improved.

The objects of the present inventive concepts are not limited to those mentioned above and additional objects of the present inventive concepts, which are not mentioned herein, will be clearly understood by those skilled in the art from the following description of the present inventive concepts.

According to an aspect of present disclosure, there is provided a memory controller that is configured to write, read, and erase data for a nonvolatile memory device that is configured to store first meta data and first journal data that indicates first changes of the first meta data, the memory controller comprising: a buffer memory circuit that includes a buffer memory and a buffer controller, wherein the buffer memory is configured to store second meta data and second journal data that indicates second changes of the second meta data, and wherein the buffer controller is configured to control the buffer memory; and an accelerator that is configured to manage the first meta data, the second meta data, the first journal data, and the second journal data, wherein the buffer controller includes: a first error correction code (a first ECC) engine that is configured to correct a first error of first data that includes the second meta data; and a second error correction code (a second ECC) engine that is configured to correct a second error of second data that includes the second journal data.

According to other aspect of present disclosure, there is provided a memory controller that is configured to write, read, and erase data for a nonvolatile memory device that is configured to store first meta data and first journal data that indicates first changes of the first meta data, the memory controller comprising: a buffer memory circuit that includes a buffer memory and a buffer controller, wherein the buffer controller includes a first error correction code (a first ECC) engine and a second error correction code (a second ECC) engine, the buffer memory includes a first meta load unit that is configured to store second meta data, and the buffer controller is configured to control the buffer memory; and an accelerator that is configured to manage the first meta data, the second meta data, and the first journal data, wherein the accelerator is configured to determine whether the first meta load unit is defective, wherein the accelerator is configured to correct at least a second portion of the second meta data read from the first meta load unit by using the second ECC engine when the first meta load unit is defective, and wherein the accelerator is configured to correct at least a first portion of the second meta data read from the first meta load unit by using the first ECC engine when the first meta load unit is not defective.

According to an aspect of present disclosure, there is provided a storage device comprising: a nonvolatile memory device that is configured to store first meta data and first journal data that indicates first changes of the first meta data; and a memory controller that is configured to write, read, and erase data for the nonvolatile memory device, wherein the memory controller includes a buffer memory circuit that includes a buffer memory and an accelerator, wherein the buffer memory is configured to store second meta data and second journal data that indicates second changes of the second meta data, wherein the accelerator is configured to manage the first and second meta data and the first and second journal data, wherein the buffer memory circuit includes a first error correction code (a first ECC) engine that is configured to correct a first error of first data that includes the second meta data, and wherein the buffer memory circuit includes a second error correction code (a second ECC) engine that is configured to correct second data that includes the second journal data.

DETAILED DESCRIPTION OF THE INVENTION

Hereinafter, the embodiments of the present inventive concepts will be described with reference to the accompanying drawings.

Figure 1:
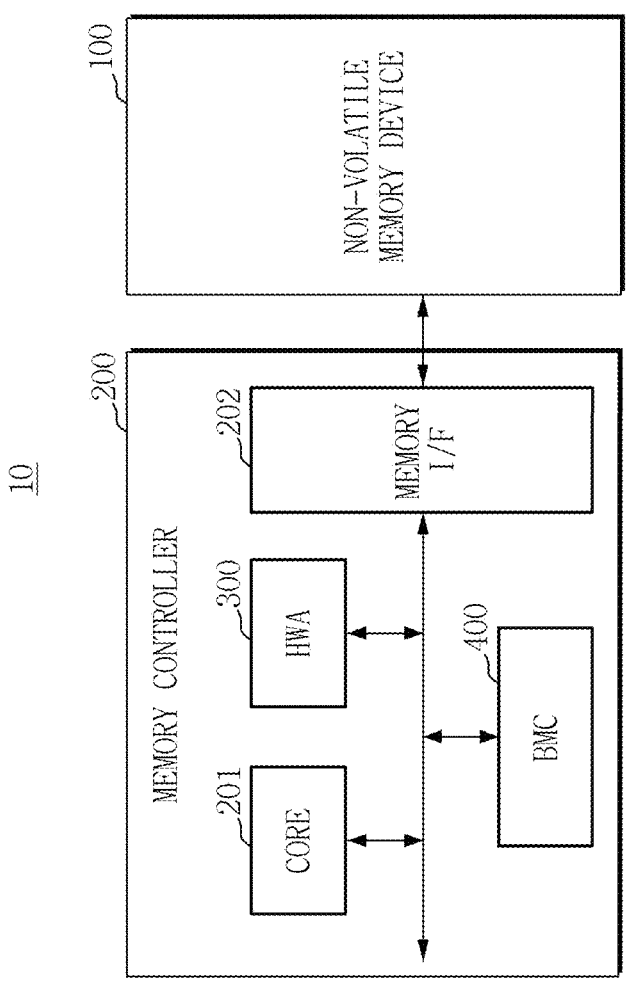
FIG. 1 is an example block diagram illustrating a memory system including a memory controller according to some embodiments.

FIG. 1 is an example block diagram illustrating a memory system including a memory controller according to some embodiments.

Referring to FIG. 1, a memory system 10 may include a memory controller 200 and a nonvolatile memory device 100. The memory controller 200 may control the nonvolatile memory device 100 to write, read, and/or erase various kinds of data in and/or from the nonvolatile memory device 100.

The memory controller 200 may include a core 201, a hardware accelerator 300, a buffer memory circuit 400 and a memory interface 202. The core 201 may process instructions required for various operations of the memory controller 200 and control components of the memory controller 200. The hardware accelerator 300 (hereinafter, may be referred to as an "accelerator") may be included in the core 201, may be implemented in combination with the core 201, or may be implemented as a separate chip (physically independent) from the core 201 depending on the embodiments. The accelerator 300 may be a dedicated circuit for managing meta data and journal data.

The buffer memory circuit 400 may temporarily store data to be written in or read from the nonvolatile memory device 100. The buffer memory circuit 400 may also store meta data including various kinds of information needed (required) for operating the memory system 10 and journal data including change details (indicating changes) of the meta data, i.e., generation, removal or update of the meta data. For example, the meta data may include a mapping table that is needed (required) to convert a logical address received from the outside into a physical address in the nonvolatile memory device 100. The mapping table may be managed by being stored in the buffer memory circuit 400. In addition, the meta data may include the number of valid pages included in the memory block of the nonvolatile memory device 100, which page is valid in the memory block and the like, but is not limited thereto. As used hereinafter, the terms "external/outside configuration", "external/outside device", "external/outside power", "external/outside signal", or "outside" are intended to broadly refer to a device, circuit, block, module, power, and/or signal that resides externally (e.g., outside of a functional or physical boundary) with respect to a given circuit, block, module, system, or device.

The memory interface 202 may be configured to transmit and receive data between the memory controller 200 and the nonvolatile memory device 100 and/or transmit various commands.

Figure 2:
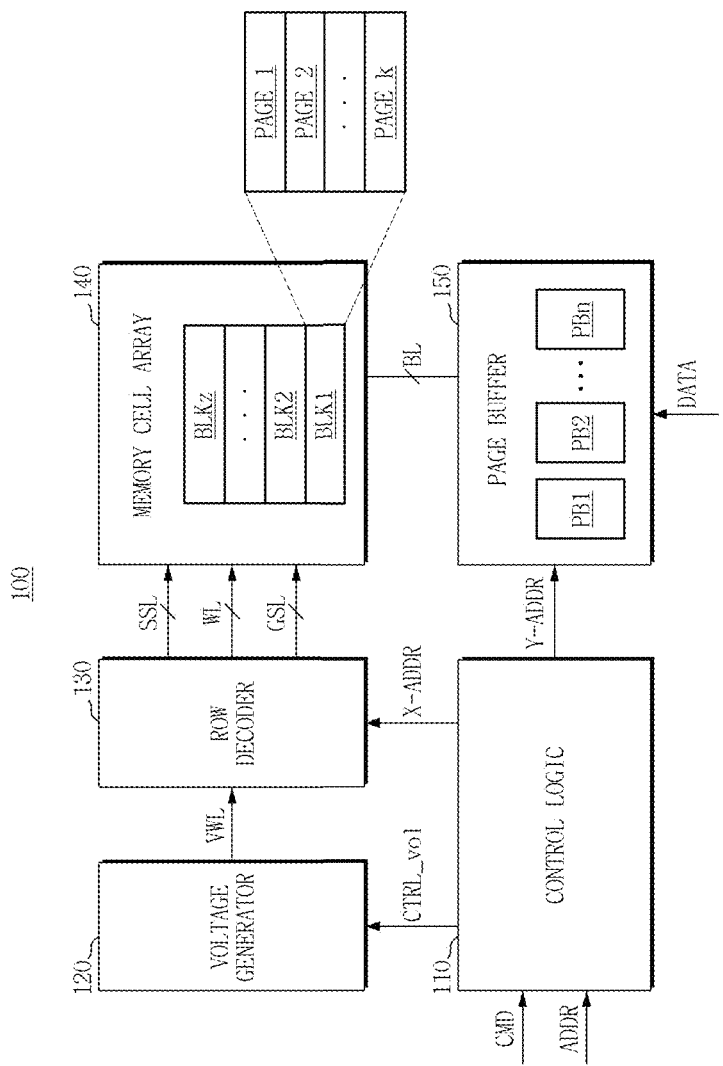
FIG. 2 is an example block diagram illustrating a nonvolatile memory device included in a memory system.

FIG. 2 is an example block diagram illustrating a nonvolatile memory device included in a memory system.

Referring to FIG. 2, the nonvolatile memory device 100 may include a control logic 110, a voltage generator 120, a row decoder 130, a memory cell array 140, and a page buffer 150. Although not shown in FIG. 2, the nonvolatile memory device 100 may further include a memory interface, and may further include a column logic, a pre-decoder, a temperature sensor, a command decoder, an address decoder, etc.

The control logic 110 may generally control various operations in the nonvolatile memory device 100. The control logic 110 may output various control signals in response to a command CMD and/or an address ADDR from the memory interface (e.g., the memory interface 202). For example, the control logic 110 may output a voltage control signal CTRL_vol, a row address X-ADDR, and a column address Y-ADDR.

The voltage generator 120 may generate various kinds of voltages for performing write, read, and erase operations based on the voltage control signal CTRL_vol. For example, the voltage generator 120 may generate a write voltage, a read voltage, a write verification voltage, an erase voltage, or the like as a word line voltage VWL.

The row decoder 130 may select one of a plurality of word lines WL in response to the row address X-ADDR, and may select one of a plurality of string selection lines SSL. For example, the row decoder 130 may apply the write voltage and the write verification voltage to the selected word line during the write operation, may apply the read voltage to the selected word line during the read operation, and may apply the erase voltage to the selected word line during the erase operation.

The memory cell array 140 may include a plurality of memory blocks BLK1 to BLKz (where 'z' is a positive integer bigger than 1), and each of the memory blocks BLK1 to BLKz may include a plurality of memory cells. The memory cell array 140 may be connected (e.g., electrically connected) to the page buffer 150 through bit lines BL, and may be connected (e.g., electrically connected) to the row decoder 130 through the word lines WL, the string selection lines SSL, and ground selection lines GSL. It will be understood that when an element or layer is referred to as being "connected to", "coupled to", "responsive to", or "on" another element or layer, it may be directly connected to, coupled to, responsive to, or on the other element or layer, or one or more intervening elements or layers may be present. In contrast, when an element is referred to as being "directly coupled," "directly connected," or "directly responsive" to, or "directly on," another element, there are no intervening elements present. In addition, "electrical connection" conceptually includes a physical connection and a physical disconnection. In addition, it will also be understood that when an element or layer is referred to as being "between" two elements or layers, it may be the only element or layer between the two elements or layers, or one or more intervening elements or layers may also be present.

According to some embodiments, each of the memory blocks BLK1 to BLKz may include a plurality of pages PAGE1 to PAGEk (where 'k' is a positive integer bigger than 1), and each of the pages PAGE1 to PAGEk may include a plurality of memory cells. The control logic 110 may perform the write and read operations of the data in units of pages (e.g., 4 KB, 8 KB, 16 KB, etc.).

The memory cell array 140 may include a three-dimensional memory cell array, and the three-dimensional memory cell array may include a plurality of NAND strings. Each NAND string may include memory cells respectively connected (e.g., electrically connected) to word lines (e.g., the word lines WL) vertically stacked on a substrate. The memory cell array 140 may also include a two-dimensional memory cell array, and the two-dimensional memory cell array may include a plurality of NAND strings disposed along row and column directions.

The page buffer 150 may include a plurality of page buffers PB1 to PBn (where 'n' is a positive integer bigger than 1), and the page buffers PB1 to PBn may be connected (e.g., electrically connected) to the memory cells (of the memory cell array 140) through the plurality of bit lines BL, respectively. The page buffer 150 may select at least one of the bit lines BL in response to the column address Y-ADDR. The page buffer 150 may operate as a write driver or a sense amplifier depending on an operation mode. For example, during the write operation, the page buffer 150 may apply a bit line voltage corresponding to data to be written in the selected bit line (among the bit lines BL). During the read operation, the page buffer 150 may sense data stored in the memory cell (of the memory cell array 140) by sensing a current or a voltage of the selected bit line (among the bit lines BL).

According to some embodiments, the control logic 110 may receive a command to write or read meta data and journal data from the accelerator (300 of FIG. 1) of the memory controller (200 of FIG. 1). The control logic 110 may receive or transmit the meta data and the journal data from the buffer memory circuit (400 of FIG. 1) of the memory controller (200 of FIG. 1).

Figure 3:
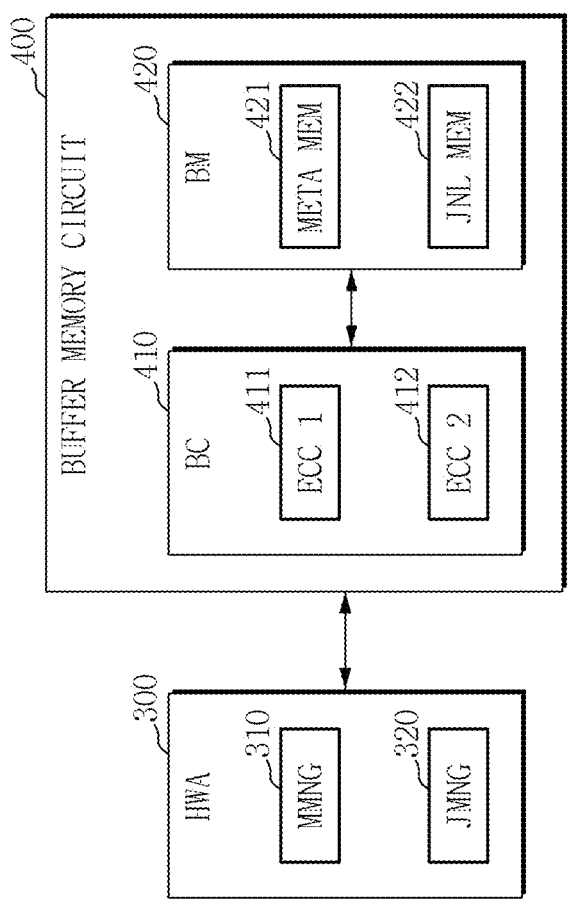
FIG. 3 is an example block diagram illustrating an accelerator and a buffer memory circuit according to some embodiments.

FIG. 3 is an example block diagram illustrating an accelerator and a buffer memory circuit according to some embodiments.

Referring to FIG. 3, the accelerator 300 may include a meta management unit (MMNG) 310 and a journal management unit (JMNG) 320. The meta management unit 310 may manage the meta data in place of the core (e.g., the core 201 of FIG. 1), and the journal management unit 320 may manage the journal data in place of the core (e.g., the core 201 of FIG. 1). For example, when a command to store user data is transmitted from the outside, the meta management unit 310 of the accelerator 300 may store meta data related to the command in a buffer memory 420 (of the buffer memory circuit 400). The journal management unit 320 of the accelerator 300 may generate journal data including change details (indicating changes) (generation/removal/update, etc.) of the meta data and store the generated journal data in the buffer memory 420 (of the buffer memory circuit 400).

When the journal data is continuously generated and a total size of the journal data stored in the buffer memory 420 reaches a preset size, the journal management unit 320 of the accelerator 300 may transfer the entire journal data stored in the buffer memory 420 to the nonvolatile memory device (e.g., the nonvolatile memory device 100 of FIG. 1).

The meta management unit 310 of the accelerator 300 may frequently transfer the meta data stored in the buffer memory 420 to the nonvolatile memory device (e.g., the nonvolatile memory device 100 of FIG. 1) in accordance with a preset logic/schedule. Since the size of the meta data is larger than the size of the journal data, it takes a long time (e.g., a longer time than the time for transferring the journal data to the nonvolatile memory device 100) to transfer and store the entire meta data in the nonvolatile memory device (e.g., the nonvolatile memory device 100 of FIG. 1). Therefore, for example, whenever the journal data is transferred to and written in the nonvolatile memory device (e.g., the nonvolatile memory device 100 of FIG. 1), some of the meta data may be transferred to and written in the nonvolatile memory device (e.g., the nonvolatile memory device 100 of FIG. 1). Therefore, the meta data and the journal data, which are stored in the nonvolatile memory device (e.g., the nonvolatile memory device 100 of FIG. 1), may not be up-to-date based on the time when the meta data and the journal data are transferred. The meta data and the journal data (that are not up-to-date) may be referred to as old meta data and old journal data, respectively.

When the accelerator 300 receives a power-off signal from the outside, the accelerator 300 may transfer the (new) meta data and the (new) journal data, which are stored in the buffer memory 420, to the nonvolatile memory device (e.g., the nonvolatile memory device 100 of FIG. 1) to update the (previous) meta data and the (previous) journal data, which are stored in the nonvolatile memory device (e.g., the nonvolatile memory device 100 of FIG. 1).

Also, a Sudden Power Off (SPO) situation may occur in the memory system 10. When the SPO occurs, the accelerator 300 may not be able to transfer all of the (new) meta data having a large size (larger than that of the journal data), which is stored in the buffer memory 420, to the nonvolatile memory device (e.g., the nonvolatile memory device 100 of FIG. 1). In this case, the accelerator 300 may transfer (new) journal data having a smaller size (capacity) than the (new) meta data to the nonvolatile memory device (e.g., the nonvolatile memory device 100 of FIG. 1) by using, for example, an internal power source of the memory controller 200.

Afterwards, when the memory system (e.g., the memory system 10 of FIG. 1) is booted, the accelerator 300 may load the (previous) meta data and the (new) journal data, which are stored in the nonvolatile memory device (e.g., the nonvolatile memory device 100 of FIG. 1), into the buffer memory 420. Also, the journal management unit 320 of the accelerator 300 may update the (previous) meta data by replaying the (new) journal data.

The buffer memory circuit 400 may include a buffer controller 410 and a buffer memory 420. The buffer controller 410 may include a first ECC engine 411 and a second ECC engine 412. The buffer memory 420 may be, for example, a volatile memory (e.g., DRAM or SRAM), but is not limited thereto. The time to write or read data in or from the buffer memory 420 may be faster than the time to write or read data in or from the memory cell array (e.g., the memory cell array 140 of FIG. 2) of the nonvolatile memory device 100. That is, in a runtime state of the memory system (e.g., the memory system 10 of FIG. 1), the meta data and the journal data may be written in or read from the buffer memory 420, thereby speeding up data processing. The buffer memory 420 may include a meta memory 421 and a journal memory 422.

The buffer controller 410 may receive a plurality of meta data and a write or read command of the meta data from the accelerator 300 to write or read the meta data in or from the meta memory 421. The buffer controller 410 may also receive a plurality of journal data and a write or read command of the journal data from the accelerator 300 to write or read the journal data in or from the journal memory 422.

Figure 4:
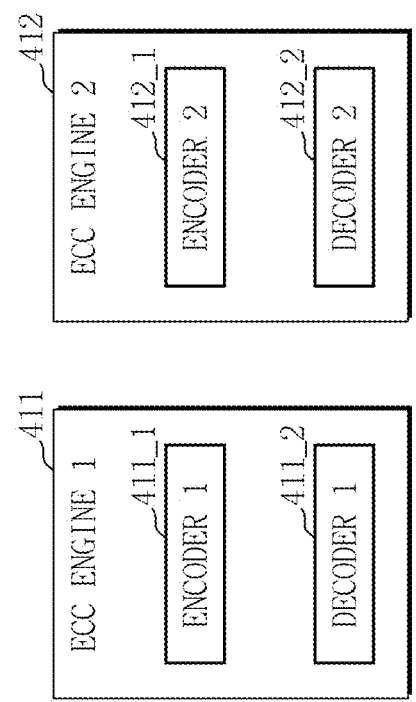
FIG. 4 is an example block diagram illustrating a first ECC engine and a second ECC engine according to some embodiments.

FIG. 4 is an example block diagram illustrating a first ECC engine and a second ECC engine according to some embodiments.

Referring to FIG. 4, the first ECC engine 411 may include a first encoding circuit 411_1 and a first decoding circuit 411_2, and the second ECC engine 412 may include a second encoding circuit 412_1 and a second decoding circuit 412_2. Each of the first and second encoding circuits 411_1 and 412_1 may receive a control command from the accelerator (e.g., the accelerator 300 of FIG. 1) to generate parity bits for write data received from the accelerator (e.g., the accelerator 300 of FIG. 1). Each of the first and second decoding circuits 411_2 and 412_2 may receive a control command from the accelerator (e.g., the accelerator 300 of FIG. 1), correct error bits of the read data by using the read data to be read and parity bits in accordance with the command of the accelerator 300 and transmit the error-corrected read data to the accelerator (e.g., the accelerator 300 of FIG. 1). Hereinafter, an operation of generating parity bits for the write data will be referred to as 'encoding', and an operation of correcting an error by using parity bits for the read data will be referred to as 'decoding'.

In a decoding process, some data having an error may fail to be decoded through the ECC engine and thus cannot be corrected. In the present inventive concepts, such data (the data having an error uncorrectable through the ECC engine) will be referred to as an uncorrectable error correction code (UECC). On the contrary, some other data having an error may be decoded through the ECC engine and then their error may be corrected and output. In the present inventive concepts, such data (the data having an error correctable through the ECC engine) will be referred to as a correctable error correction code (CECC).

According to some embodiments, the first ECC engine 411 and the second ECC engine 412 may have different error correction performances. For example, the first ECC engine 411 and the second ECC engine 412 may have different unit sizes in write data to be encoded and read data to be decoded. In this case, the larger unit size of data may mean that the number of bits of data to be encoded or decoded is larger. The larger the unit size of write data to be encoded is and/or the larger the unit size of read data to be decoded is, the higher the error correction performance may be. For example, the second ECC engine 412 may have a larger unit size of data input and/or a larger unit size of data output than those of the first ECC engine 411.

However, encoding the larger write data or decoding the larger read data may increase overhead in a data transmission and reception process of the buffer controller 410. Therefore, there is a need to achieve an appropriate balance between improving reliability through the application of the ECC engines having higher performance and increasing overhead occurring in the data transmission and reception process. In addition, a plurality of ECC engines having different error correction performances may be configured by various other methods and are not limited to the above-described methods.

Figure 5:
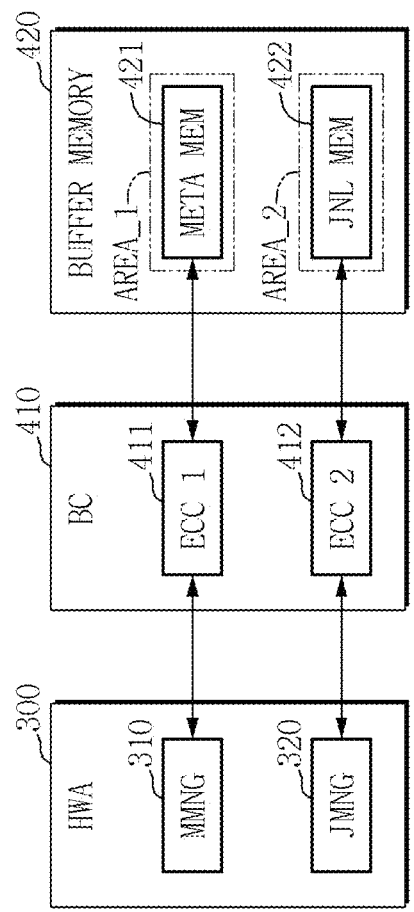
FIG. 5 is an example block diagram illustrating a process of writing and reading data with respect to a buffer memory.

FIG. 5 is an example block diagram illustrating a process of writing and reading data with respect to a buffer memory.

Referring to FIG. 5, the accelerator 300 may divide a storage space of the buffer memory 420 into a first area AREA_1 and a second area AREA_2. The accelerator 300 may set the meta memory 421 in which the meta data is stored in the buffer memory 420 to the first area AREA_1, and may set the journal memory 422 in which the journal data is stored to the second area AREA_2.

The accelerator 300 may set the write data, which is written in the first area AREA_1, to be encoded through the first ECC engine 411, and may set the read data, which is stored in the first area AREA_1 and becomes a target for the read operation, to be decoded through the first ECC engine 411. The accelerator 300 may set the write data, which is to be written in the second area AREA_2, to be encoded through the second ECC engine 412, and may set the read data, which is stored in the second area AREA_2 and becomes a target for the read operation, to be decoded through the second ECC engine 412.

Figure 6:
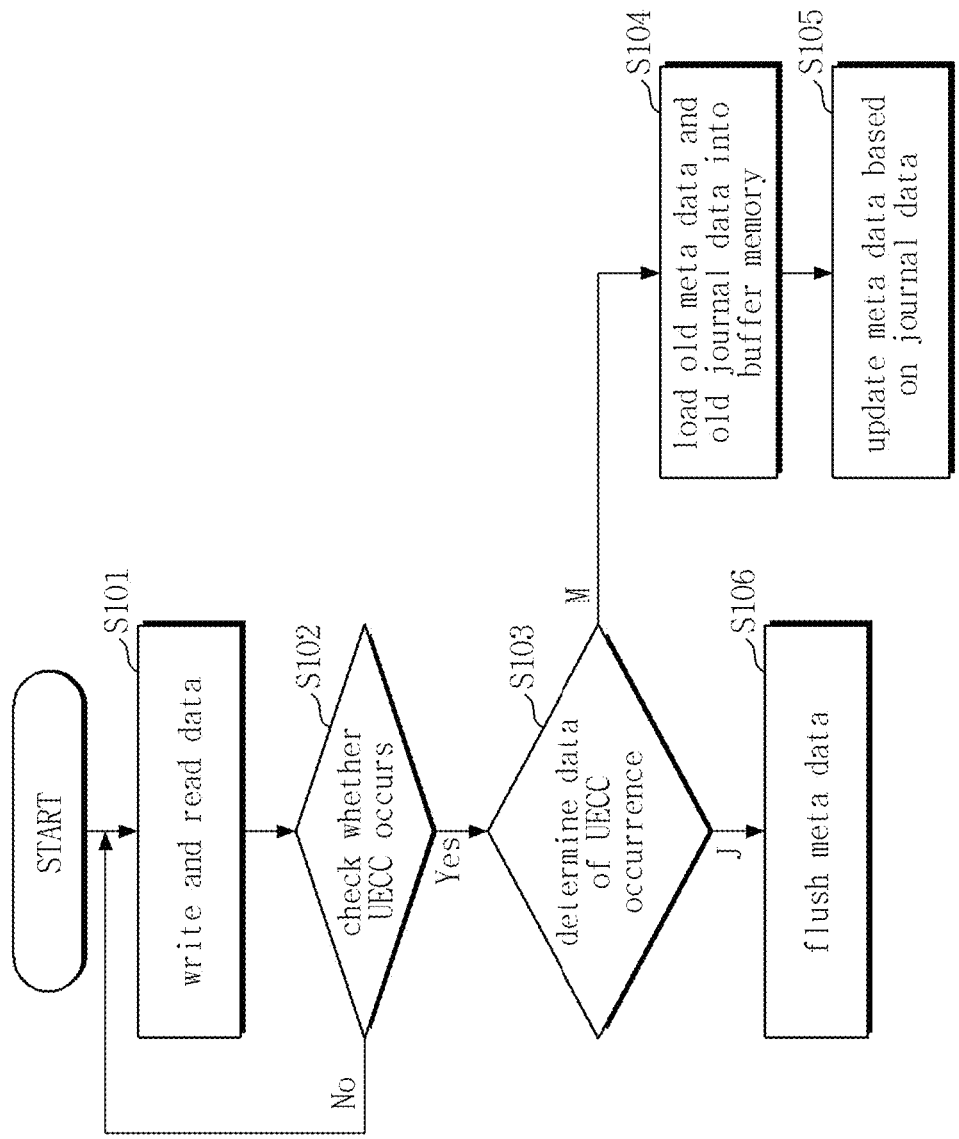
FIG. 6 is an example flow chart illustrating a process of recovering an error of some of data stored in a buffer memory when the error cannot be corrected.
Figure 7:
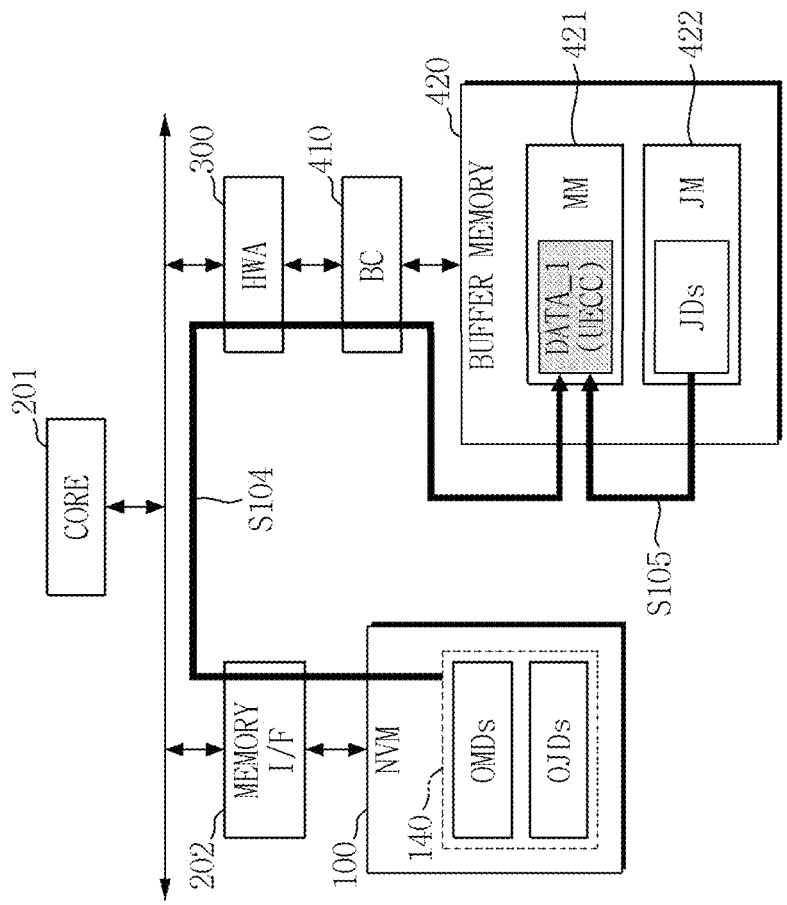
FIGS. 7 and 8 are example block diagrams illustrating a process of recovering an error of some of data stored in a buffer memory when the error cannot be corrected.
Figure 8:
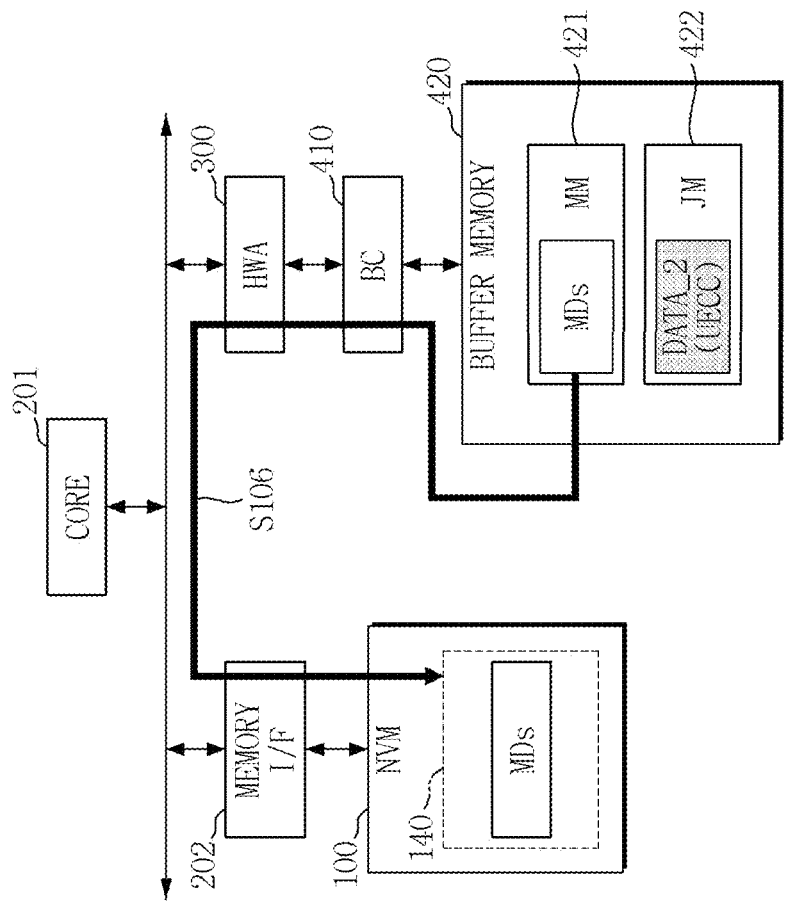

FIG. 6 is an example flow chart illustrating a process of recovering an error of some of data stored in a buffer memory when the error cannot be corrected. FIGS. 7 and 8 are example block diagrams illustrating a process of recovering an error of some of data stored in a buffer memory when the error cannot be corrected.

Referring to FIGS. 6 to 8, during the runtime of the memory system (e.g., the memory system 10 of FIG. 1), a plurality of meta data and a plurality of journal data may be written in and read from the buffer memory 420 through the accelerator 300 (S101). The buffer controller 410 may perform encoding for written data and perform decoding for read data.

While the data is being written or read, the accelerator 300 may check whether the UECC occurs (S102). When the UECC does not occur (S102—No), the writing or reading of the data may be repeated as it is (e.g., without correction). When the UECC occurs (S102—Yes), the accelerator 300 may determine whether the data in which the UECC occurs is meta data or journal data (S103).

When it is determined that the UECC has occurred in first data DATA_1 which is a portion of the meta data stored in the buffer memory 420 (S103-M), the accelerator 300 may load old meta data OMDs and old journal data OJDs, which are stored in the nonvolatile memory device 100, into the buffer memory (e.g., the buffer memory 420) through the memory interface 202 (S104). Also, the accelerator 300 may update the meta data based on journal data JDs that are stored in the journal memory 422 of the buffer memory 420 and include change details (indicate changes) of the meta data (S105). In other words, even though the first data DATA_1 is damaged or lost, the meta data may be recovered using a plurality of old meta data OMDs and a plurality of old journal data OJDs, which are stored in the nonvolatile memory device (e.g., the nonvolatile memory device 100 of FIG. 1), and a plurality of journal data JDs stored in (the journal memory 422 of) the buffer memory 420.

When it is determined that the UECC has occurred in the second data DATA_2, which is a portion of the journal data stored in the buffer memory 420 (S103-J), the accelerator 300 may transfer (flush) the meta data MDs stored in (the meta memory 421 of) the buffer memory 420 to the nonvolatile memory device 100 (S106). Therefore, the meta data may be preserved, so that reliability of the meta data may be ensured.

Referring to FIG. 5, the second ECC engine 412 of the buffer controller 410 may have higher error correction performance than that of the first ECC engine 411. The second ECC engine 412 may correct an error in data to be written in or read from the second area AREA_2, and the second area AREA_2 may include the journal memory 422. The first ECC engine 411 may correct an error in data to be written in or read from the first area AREA_1, and the first area AREA_1 may include the meta memory 421. That is, when writing or reading the journal data, the ECC engine having relatively high performance may be used, whereby reliability of the memory system may be increased.

Meanwhile, increasing the size of data written in or read from the buffer memory 420 to improve error correction performance may increase overhead during data transmission and reception of the buffer memory 420 as described above.

According to some embodiments, by differentially applying the ECC engine having high performance to a plurality of journal data stored in the buffer memory 420 (e.g., higher performance than a performance of an ECC engine applied to a plurality of meta data stored in the buffer memory 420), which are relatively small (smaller) in size as compared with a plurality of meta data stored in the buffer memory 420, an appropriate balance may be achieved between improving reliability through the application of the ECC engine having higher performance and increasing overhead occurring in the data transmission and reception process.

Also, as the ECC engine having relatively low (lower) performance is applied to the meta data, when reliability of the journal data stored in the buffer memory 420 is ensured even though the UECC occurs, the meta data may be recovered using the journal data stored in the buffer memory 420. As a result, it is possible to prevent damage or loss of the meta data without significantly increasing the overhead occurring in the data transmission and reception process, thereby providing a memory system with improved reliability.

Figure 9:
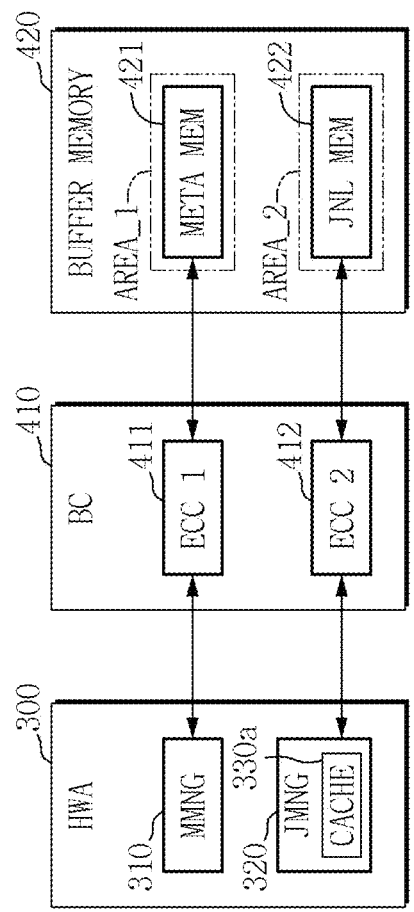
FIG. 9 is an example block diagram illustrating a process of writing and reading data with respect to a buffer memory.

FIG. 9 is an example block diagram illustrating a process of writing and reading data with respect to a buffer memory.

Referring to FIG. 9, the accelerator 300 may further include a first cache 330a. Although the first cache 330a is shown as being included in the journal management unit 320, the first cache 330a may be included by being packaged in the accelerator 300 or may be positioned outside the accelerator 300, but is not limited to any form. The first cache 330a may have a smaller storage capacity than the buffer memory 420, but may have a faster speed than the buffer memory 420.

According to some embodiments, the accelerator 300 may divide a storage space of the buffer memory 420 into a first area AREA_1 and a second area AREA_2. The accelerator 300 may set the meta memory 421, in which the meta data is stored in the buffer memory 420, to the first area AREA_1, and may set the journal memory 422, in which the journal data is stored, to the second area AREA_2.

The accelerator 300 may set the write data, which is written in the first area AREA_1, to be encoded through the first ECC engine 411, and may set the read data, which is stored in the first area AREA_1 and becomes a target for the read operation, to be decoded through the first ECC engine 411. The accelerator 300 may set the write data, which is to be written in the second area AREA_2, to be encoded through the second ECC engine 412, and may set the read data, which is stored in the second area AREA_2 and becomes a target for the read operation, to be decoded through the second ECC engine 412.

Since the journal management unit 320 of the accelerator 300 directly generates journal data and stores the journal data in the buffer memory 420, the journal management unit 320 may generate journal data having a unit size as large as the size (capacity) of the first cache 330a. For example, when the capacity of the first cache 330a is 4 KB, the journal management unit 320 may generate journal data having a size of 4 KB and transmit the generated journal data to the buffer controller 410 (e.g., the second ECC engine 412).

Meanwhile, in case of the meta data, it is difficult to flexibly adjust the size of data to be cached in view of characteristics of the meta data. As described above, since the error correction performance of the ECC engine may be improved as the write data to be encoded is larger, the ECC engine of ultra-high reliability may be applied to the journal data to prevent damage or loss of the meta data, whereby a memory system with improved reliability may be provided.

Figure 10:
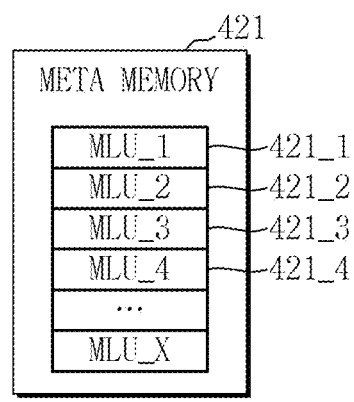
FIG. 10 is an example block diagram illustrating a meta memory according to some embodiments.

FIG. 10 is an example block diagram illustrating a meta memory according to some embodiments.

Referring to FIG. 10, an internal storage space of the meta memory 421 may be divided into a plurality of meta load units (MLU). Each meta load unit may store at least a portion of the meta data stored in the meta memory 421. Each meta load unit may have the same size as the pages (e.g., the plurality of pages PAGE1 to PAGEk of FIG. 2) that are units for writing or reading data in or from the memory cell array (e.g., the memory cell array 140 of FIG. 2) of the nonvolatile memory device (e.g., the nonvolatile memory device 100 of FIG. 1).

Figure 11:
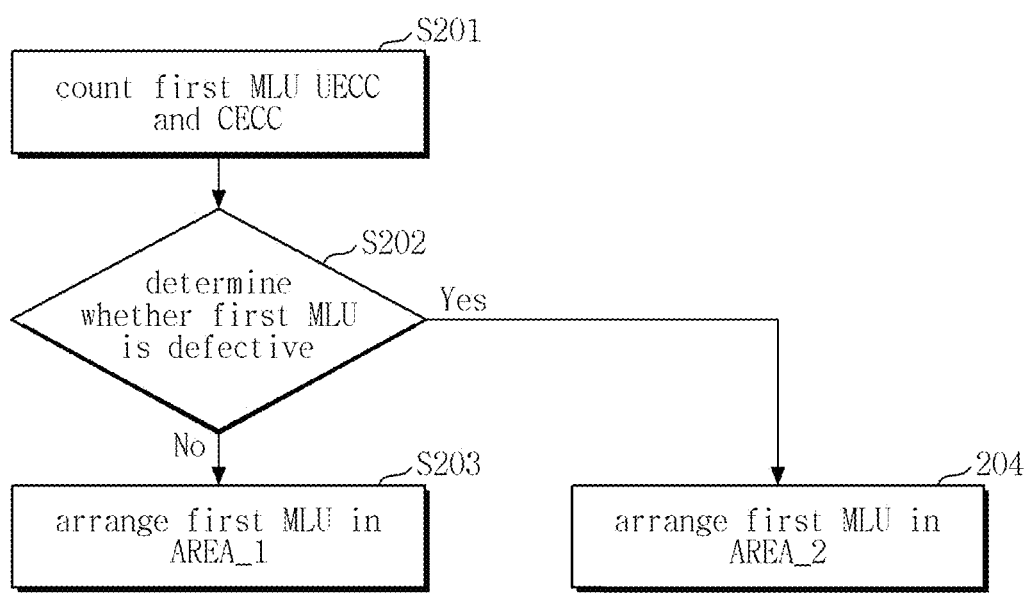
FIG. 11 is an example flow chart illustrating a process, in which an accelerator arranges each meta load unit in a first area or a second area, according to some embodiments.
Figure 12:
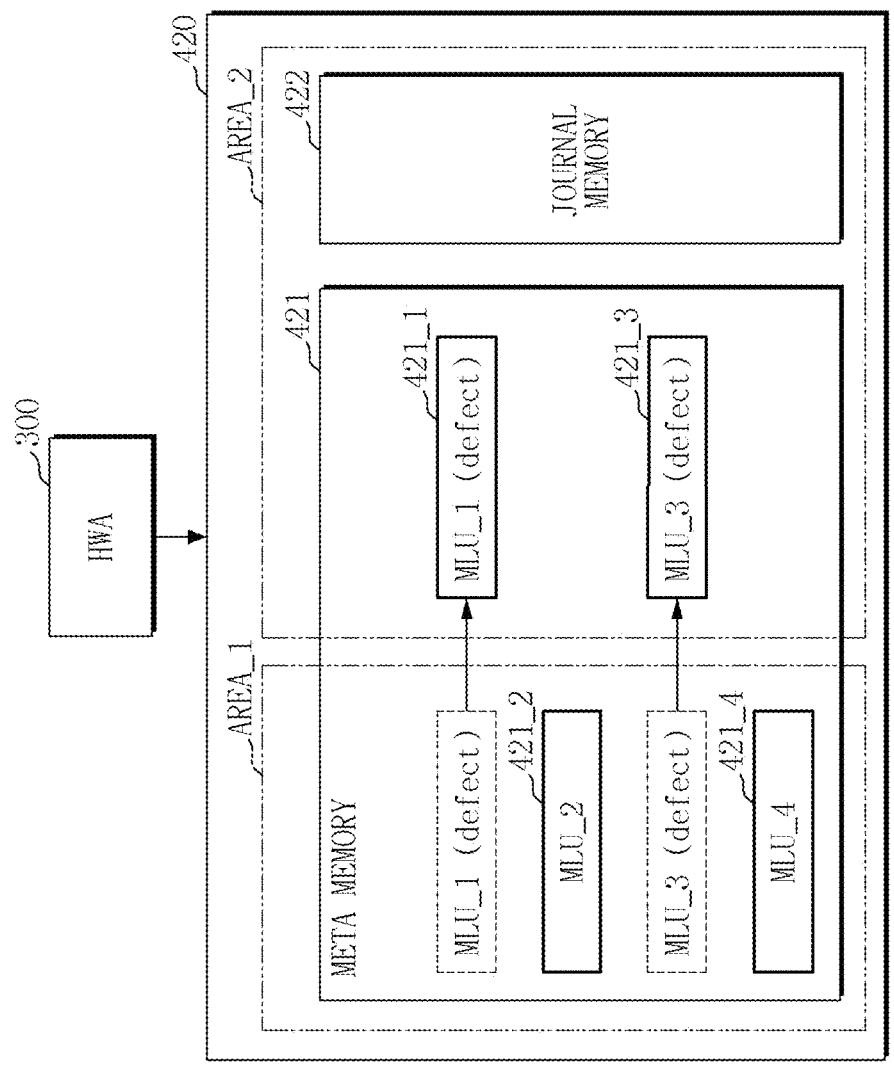
FIG. 12 is an example block diagram illustrating a process, in which an accelerator arranges each meta load unit in a first area or a second area, according to some embodiments.

FIG. 11 is an example flow chart illustrating a process, in which an accelerator arranges each meta load unit in a first area or a second area, according to some embodiments. FIG. 12 is an example block diagram illustrating a process, in which an accelerator arranges each meta load unit in a first area or a second area, according to some embodiments.

Referring to FIGS. 11 and 12, data may be written in and read from, for example, a first meta load unit 421_1 of the plurality of meta load units during the runtime of the memory system (e.g., the memory system 10 of FIG. 1). The accelerator 300 may count UECC and CECC, which are occurred in the first meta load unit 421_1 (S201). For example, the accelerator 300 may count the UECC and the CECC, which are occurred in the first meta load unit 421_1, for a predetermined number of times or a period of time, but the method in which the accelerator 300 counts the UECC and the CECC is not limited to any specific method.

The accelerator 300 may determine whether the first meta load unit 421_1 is defective by counting the UECC and the CECC, which are occurred in the first meta load unit 421_1 (S202). Whether the (n)th meta load unit is defective may be determined by the following equation, but this is only example, and may be obtained in other ways.

$$N\_ECC[n] = \alpha * N\_UECC[n] + \beta * N\_CECC[n]$$

In this case, α and β are preset constants, and may be determined as various values in accordance with embodiments. N_UECC[n] represents the number of occurrences of UECC in the (n)th meta load unit. In case of the first meta load unit 421_1, N_UECC[1] is obtained. N_CECC[n] represents the number of occurrences of CECC in the (n)th meta load unit. In case of the first meta load unit 421_1, N_CECC[1] is obtained.

The accelerator 300 may compare N_ECC[n] with a preset threshold value Nth and determine that the (n)th meta load unit is not defective when N_ECC[n] is less than Nth, that is, in case of N_ECC[n]<Nth. In addition, the accelerator 300 may determine that the (n)th meta load unit is defective when N_ECC[n] is greater than or equal to Nth, that is, in case of N_ECC[n]≥Nth. In this case, the Nth may be variously determined depending on the embodiments. For example, the accelerator 300 may determine whether a meta load unit is defective based on a ratio of a number of error correction successes (e.g., N_CECC[n]) and a number of error correction failures (e.g., N_UECC[n]).

When it is determined that the first meta load unit 421_1 is not defective (S202—No), the accelerator 300 may arrange the first meta load unit 421_1 in the first area AREA_1 (S203). When it is determined that the first meta load unit 421_1 is defective (S202—Yes), the accelerator 300 may arrange the first meta load unit 421_1 in the second area AREA_2 (S204). In this case, the meaning of "arrangement" may not mean a physical movement but mean an address change, etc. of the meta load unit.

The accelerator 300 may determine a defect with respect to each of the plurality of meta load units, and may arrange each meta load unit in the first area AREA_1 or the second area AREA_2 based on the determined result. For example, when the accelerator 300 determines that the first meta load unit 421_1 and a third meta load unit 421_3 have a defect, the accelerator 300 may arrange the first meta load unit 421_1 and the third meta load unit 421_3 in the second area AREA_2. The accelerator 300 may arrange a second meta load unit 421_2 and a fourth meta load unit 421_4, which are determined to have no defect, in the first area AREA_1.

In conclusion, the second area AREA_2 may include the journal memory 422 and a partial space of the meta memory 421 occupied by the meta load unit determined to have a defect among the plurality of meta load units, and the first area AREA_1 may include a partial space of the meta memory 421 occupied by the meta load unit determined to have no defect among the plurality of meta load units.

A defect may occur in a partial storage space of the buffer memory 420 due to various reasons such as a manufacturing defect. When a defect occurs in a partial storage space, a plurality of UECCs may occur when data is written in or read from a meta load unit, which includes or is adjacent to the corresponding space.

According to some embodiments, the accelerator 300 may allow the meta load unit to be arranged in the second area AREA_2 (when the meta load unit is defective), thereby correcting a data error (e.g., meta data error) through the ECC engine (e.g., the second ECC engine 412) having high performance (e.g., higher than the first ECC engine 411) differentially from other meta units. For example, when the meta load unit is not defective, the accelerator 300 may arrange the meta load unit to the first area AREA_1 so that the first ECC engine 411 may correct data error (e.g., meta data error). Therefore, an appropriate balance may be achieved between improving reliability through the application of the ECC engine having higher performance and increasing overhead occurring in the data transmission and reception process.

Figure 13:
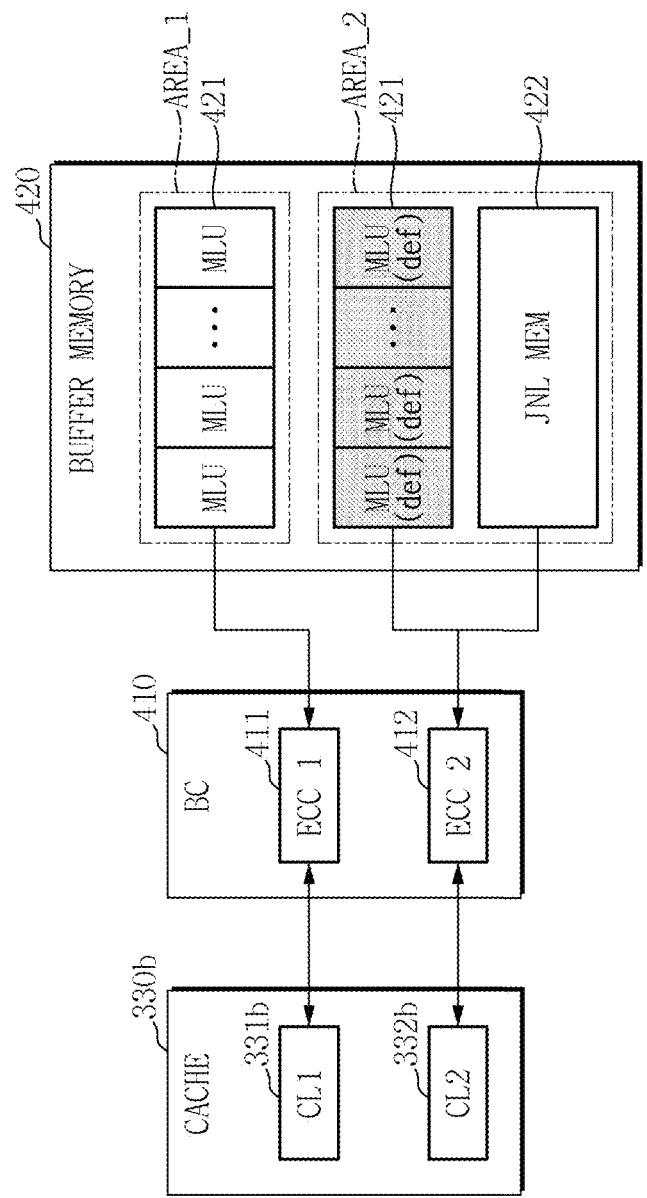
FIG. 13 is an example block diagram illustrating a process of writing and reading data with respect to a buffer memory.

FIG. 13 is an example block diagram illustrating a process of writing and reading data with respect to a buffer memory.

Referring to FIG. 13, the memory controller (e.g., the memory controller 200 of FIG. 1) may further include a second cache 330*b*. Although the second cache 330*b* is shown as being positioned outside the accelerator (e.g., the accelerator 300 of FIG. 1), the second cache 330*b* may be included by being packaged inside the accelerator (e.g., the accelerator 300 of FIG. 1) or may be positioned outside the accelerator (e.g., the accelerator 300 of FIG. 1), but is not limited to any form.

The second cache 330*b* may have a smaller storage capacity than the buffer memory 420, but may have a faster speed than the buffer memory 420. The second cache 330*b* may include a plurality of cache lines. The plurality of cache lines may respectively have various sizes. For example, the second cache 330*b* may include a first cache line 331*b* and a second cache line 332*b*.

According to some embodiments, the accelerator 300 may divide a storage space of the buffer memory 420 into a first area AREA_1 and a second area AREA_2. The accelerator 300 may set a partial space of the meta memory 421 occupied by the meta load unit determined to have no defect among the plurality of meta load units to the first area AREA_1, and may set the journal memory 422 and a partial space of the meta memory 421 occupied by the meta load unit determined to have a defect among the plurality of meta load units to the second area AREA_2.

The accelerator 300 may set the write data, which is written in the first area AREA_1, to be encoded through the first ECC engine 411, and may set the read data, which is stored in the first area AREA_1 and becomes a target for the read operation, to be decoded through the first ECC engine 411. The accelerator 300 may also set the write data, which is to be written in the second area AREA_2, to be encoded through the second ECC engine 412, and may set the read data, which is stored in the second area AREA_2 and becomes a target for the read operation, to be decoded through the second ECC engine 412.

In this case, a size of the first cache line 331*b* may be the same as a unit size of the write data written in the first area AREA_1 and a unit size of the read data to be read from the first area AREA_1. A size of the second cache line 332*b* may be the same as a unit size of write data to be written in the second area AREA_2 and a unit size of the read data to be read from the second area AREA_2. By matching the unit sizes of the written and read data with the cache line size of the second cache 330*b*, it is possible to prevent performance degradation that may occur during the process of writing and reading data. For example, the first cache line 331*b* and the first ECC engine 411 may have the same unit size for data (e.g., metal data) written in and/or read from the first area AREA_1. The second cache line 332*b* and the second ECC engine 412 may have the same unit size for data (e.g., journal data) written in and/or read from the second area AREA_2.

Figure 14:
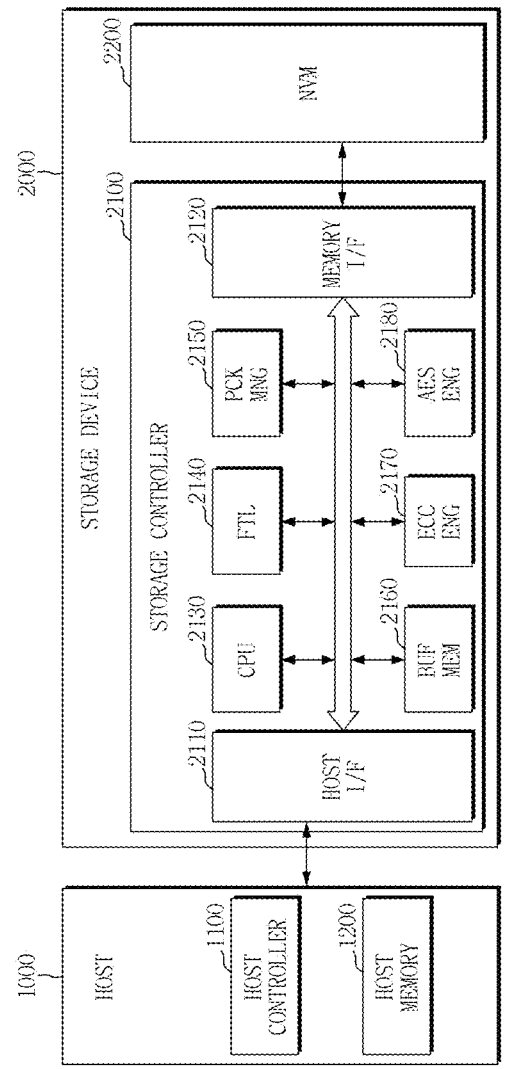
FIG. 14 is an example block diagram illustrating a storage device to which a memory controller is applied, according to some embodiments.

FIG. 14 is an example block diagram illustrating a storage device to which a memory controller is applied, according to some embodiments.

Referring to FIG. 14, the storage device 2000 may include a storage controller 2100 and a nonvolatile memory device (NVM) 2200. Also, the host 1000 may include a host controller 1100 and a host memory 1200. The host memory 1200 may serve as a buffer memory for temporarily storing data to be transmitted to the storage device 2000 or data transmitted from the storage device 2000.

The storage device 2000 may include storage media for storing data in response to a request from the host 1000. As an example, the storage device 2000 may include at least one of a solid state drive (SSD), an embedded memory, or a detachable external memory. When the storage device 2000 is an SSD, the storage device 2000 may be a device that complies with a non-volatile memory express (NVMe) standard. When the storage device 2000 is the embedded memory or the external memory, the storage device 2000 may be a device that complies with a universal flash storage (UFS) standard or an embedded multi-media card (cMMC) standard. Each of the host 1000 and the storage device 2000 may generate and transmit packets according to a standard protocol that is employed.

When the nonvolatile memory device 2200 of the storage device 2000 includes a flash memory, the flash memory may include a 2D NAND memory array or a 3D (or vertical) NAND (VNAND) memory array. In some embodiments, the storage device 2000 may include other various types of nonvolatile memories. For example, a magnetic random access memory (MRAM), a spin-transfer torque MRAM, a Conductive Bridging RAM (CBRAM), a Ferroelectric RAM (FeRAM), a Phase RAM (PRAM), a Resistive RAM and other various types of memories may be applied to the storage device 2000.

The host controller 1100 and the host memory 1200 may be implemented as separate semiconductor chips. Also, the host controller 1100 and the host memory 1200 may be integrated into the same semiconductor chip. As an example, the host controller 1100 may be any one of a plurality of modules provided in an application processor, and the application processor may be implemented as a system on chip (SoC). In addition, the host memory 1200 may be an embedded memory provided in the application processor, or a nonvolatile memory or a memory module disposed outside the application processor.

The host controller 1100 may store data (e.g., write data) of a buffer region in the nonvolatile memory device 2200, or may manage an operation of storing data (e.g., read data) of the nonvolatile memory device 2200 in the buffer region.

The storage controller 2100 may include a host interface 2110, a storage memory interface 2120, and a central processing unit (CPU) 2130. In addition, the storage controller 2100 may further include a flash translation layer (FTL) 2140, a packet manager 2150, a buffer memory 2160, an error correction code (ECC) engine 2170, and an advanced encryption standard (AES) engine 2180. Although not shown, the storage controller 2100 may further include an accelerator (not shown) that is a dedicated circuit for managing meta data and journal data. In accordance with the embodiments, the accelerator may be implemented by being included in the CPU 2130, may be implemented by being coupled to the CPU 2130, or may be implemented as a separate chip physically independent of the CPU 2130.

In detail, the storage device 2000 may receive a storage device driving signal from the host 1000 through the host interface 2110. The CPU 213 may transmit an initialization command in response to the storage device driving signal. The initialization command may be transmitted to the nonvolatile memory device 2200 through the storage memory interface 2120.

The host interface 2110 may transmit and receive packets to and from the host 1000. The packets transmitted from the host 1000 to the host interface 2110 may include a command or data to be written in the nonvolatile memory device 2200, and the packets transmitted from the host interface 2110 to the host 1000 may include a response to the command or data read from the nonvolatile memory device 2200. The storage memory interface 2120 may transmit data to be written in the nonvolatile memory device 2200 to the nonvolatile memory device 2200 or receive data read from the nonvolatile memory device 2200. The storage memory interface 2120 may be implemented to comply with a standard regulation such as toggle or Open NAND Flash Interface (ONFI).

The flash translation layer 2140 may perform various functions such as address mapping, wear-leveling and garbage collection. The address mapping operation is an operation of changing a logical address received from the host 1000 to a physical address used to actually store data in the nonvolatile memory device 2200. The wear-leveling is a technique for allowing blocks in the nonvolatile memory device 2200 to be uniformly used to prevent a specific block from being excessively degraded, and may be implemented through firmware technology for balancing erase counts of physical blocks by way of example. The garbage collection is a technique for making sure of available capacity in the nonvolatile memory device 2200 through a method of copying valid data of a block to a new block and then erasing the existing block.

The packet manager 2150 may generate packets according to a protocol of an interface negotiated with the host 1000 or parse various kinds of information from the packets received from the host 1000. Also, the buffer memory 2160 may temporarily store data to be written in the nonvolatile memory device 2200 or data to be read from the nonvolatile memory device 2200.

The buffer memory 2160 may be provided in the storage controller 2100, but may be disposed outside the storage controller 2100. The buffer memory 2160 may temporarily store data to be written in or read from the nonvolatile memory device 2200. The buffer memory 2160 may also store meta data including various kinds of information required for operating the storage device 2000 and journal data including change details (indicating changes, such as generation, removal, or update) of the meta data. For example, the meta data may include a mapping table required to convert an address by the flash translation layer 2140. In addition, the meta data may include the number of valid pages included in the memory block of the nonvolatile memory device 2200, which page is valid in the memory block and the like, but is not limited thereto.

The ECC engine 2170 may perform error detection and correction functions for the read data read from the nonvolatile memory device 2200. In more detail, the ECC engine 2170 may generate parity bits for write data to be written in the nonvolatile memory device 2200, and the generated parity bits may be stored in the nonvolatile memory device 2200 together with the write data. When reading the data from the nonvolatile memory device 2200, the ECC engine 2170 may correct an error of the read data by using the parity bits read from the nonvolatile memory device 2200 together with the read data, and then may output the error-corrected read data.

The AES engine 2180 may perform at least one of an encryption operation or a decryption operation for the data input to the storage controller 2100 by using a symmetric-key algorithm.

Although embodiments of the present inventive concepts have been described with reference to the accompanying drawings, embodiments of the present inventive concepts are not limited to the above embodiments, but may be implemented in various different forms. A person skilled in the art may appreciate that the present inventive concepts may be practiced in other concrete forms without changing the technical or essential characteristics of the present inventive concepts. Therefore, it should be appreciated that the embodiments as described above is not restrictive but illustrative in all respects.

What is claimed is:

1. A memory controller that is configured to write, read, and erase data for a nonvolatile memory device that is configured to store first meta data and first journal data that indicates first changes of the first meta data, the memory controller comprising:
    a buffer memory circuit that includes a buffer memory and a buffer controller, wherein the buffer memory is configured to store second meta data and second journal data that indicates second changes of the second meta data, and wherein the buffer controller is configured to control the buffer memory; and an accelerator that is configured to manage the first meta data, the second meta data, the first journal data, and the second journal data, wherein the buffer controller includes:

a first error correction code (a first ECC) engine that is configured to correct a first error of first data that includes the second meta data; and a second error correction code (a second ECC) engine that is configured to correct a second error of second data that includes the second journal data.

2. The memory controller of claim 1, wherein the second ECC engine has a higher error correction performance than that of the first ECC engine.

3. The memory controller of claim 2, wherein the first ECC engine has a first unit size of data input, wherein the second ECC engine has a second unit size of data input, and wherein the second unit size of data input is larger than the first unit size of data input.

4. The memory controller of claim 1, wherein the accelerator is configured to recover the second meta data based on the first meta data and the first journal data when the first ECC engine fails to correct the first error.

5. The memory controller of claim 4, wherein the accelerator is configured to recover the second meta data based on the second journal data when the first ECC engine fails to correct the first error.

6. The memory controller of claim 1, wherein the accelerator is configured to transfer the second meta data from the buffer memory to the nonvolatile memory device when the second ECC engine fails to correct the second error.

7. The memory controller of claim 1, further comprising:

a cache that is configured to have a faster speed than the buffer memory, wherein the cache includes a cache line, and wherein the second ECC engine and the cache line have a same unit size for an input of the second data.

8. The memory controller of claim 1, wherein the buffer memory includes a meta memory that is configured to store the second meta data, wherein the meta memory includes a plurality of meta load units that includes a first meta load unit, and wherein the accelerator is configured to determine whether the first meta load unit is defective and correct at least a portion of the second meta data stored in the first meta load unit by the second ECC engine when the first meta load unit is defective.

9. The memory controller of claim 8, wherein the accelerator is configured determine whether the first meta load unit is defective based on a ratio of a number of error correction successes and a number of error correction failures, which have occurred during a reading process of the at least the portion of the second meta data stored in the first meta load unit.

10. The memory controller of claim 8, further comprising:

a cache that is configured to have a faster speed than the buffer memory, wherein the cache includes a first cache line that is configured to temporarily store the first data and a second cache line that is configured to temporarily store the second data, wherein the first cache line and the first ECC engine have a first unit size for a first input of the first data, and wherein the second cache line and the second ECC engine have a second unit size for a second input of the second data.

11. A memory controller that is configured to write, read, and erase data for a nonvolatile memory device that is configured to store first meta data and first journal data that indicates first changes of the first meta data, the memory controller comprising:

a buffer memory circuit that includes a buffer memory and a buffer controller, wherein the buffer controller includes a first error correction code (a first ECC) engine and a second error correction code (a second ECC) engine, the buffer memory includes a first meta load unit that is configured to store second meta data, and the buffer controller is configured to control the buffer memory; and an accelerator that is configured to manage the first meta data, the second meta data, and the first journal data, wherein the accelerator is configured to determine whether the first meta load unit is defective, wherein the accelerator is configured to correct at least a second portion of the second meta data read from the first meta load unit by using the second ECC engine when the first meta load unit is defective, and wherein the accelerator is configured to correct at least a first portion of the second meta data read from the first meta load unit by using the first ECC engine when the first meta load unit is not defective.

12. The memory controller of claim 11, wherein the second ECC engine is configured to have a higher error correction performance than that of the first ECC engine.

13. The memory controller of claim 12, wherein a second unit size of data input to the second ECC engine is larger than a first unit size of data input to the first ECC engine.

14. The memory controller of claim 11, wherein the accelerator is configured to determine whether the first meta load unit is defective based on a ratio of a number of error correction successes and a number of error correction failures, which have occurred during a reading process of the second meta data stored in the first meta load unit.

15. The memory controller of claim 11, further comprising:

a cache, wherein the cache includes a first cache line that is configured to temporarily store first data that is read from the first meta load unit when the first meta load unit is defective, wherein the cache includes a second cache line that is configured to temporarily store second data that is read from the first meta load unit when the first meta load unit is not defective, wherein the first cache line has a first same size as that of a first data input to the first ECC engine, and wherein the second cache line has a second same size as that of a second data input to the second ECC engine.

16. The memory controller of claim 11, wherein the accelerator is configured to recover the second meta data based on the first meta data and the first journal data when at least one error correction of the second meta data fails.

17. The memory controller of claim 16, wherein the buffer memory is configured to store second journal data that indicates updates of the second meta data, and wherein the accelerator is configured to recover the second meta data based on the second journal data when at least one error correction of the second meta data fails.

18. A storage device comprising:

a nonvolatile memory device that is configured to store first meta data and first journal data that indicates first changes of the first meta data; and a memory controller that is configured to write, read, and erase data for the nonvolatile memory device, wherein the memory controller includes a buffer memory circuit that includes a buffer memory and an accelerator, wherein the buffer memory is configured to store second meta data and second journal data that indicates second changes of the second meta data, wherein the accelerator is configured to manage the first and second meta data and the first and second journal data, wherein the buffer memory circuit includes a first error correction code (a first ECC) engine that is configured to correct a first error of first data that includes the second meta data, and wherein the buffer memory circuit includes a second error correction code (a second ECC) engine that is configured to correct second data that includes the second journal data.

19. The storage device of claim 18, wherein the second ECC engine is configured to have a higher error correction performance than that of the first ECC engine.

20. The storage device of claim 19, wherein a second unit size of data input to the second ECC engine is larger than a first unit size of data input to the first ECC engine.

* * * * *